(12) United States Patent
Kuwata

(10) Patent No.: US 8,270,526 B2
(45) Date of Patent: Sep. 18, 2012

(54) COMMUNICATION SYSTEM

(75) Inventor: Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 789 days.

(21) Appl. No.: 12/361,995

(22) Filed: Jan. 29, 2009

(65) Prior Publication Data
US 2009/0190690 A1 Jul. 30, 2009

(30) Foreign Application Priority Data

Jan. 30, 2008 (JP) ................................. 2008-018885

(51) Int. Cl.
*H04L 25/49* (2006.01)
(52) U.S. Cl. .......................... 375/293; 375/362; 375/371
(58) Field of Classification Search .......... 375/286–294, 375/362, 371
See application file for complete search history.

(56) References Cited

U.S. PATENT DOCUMENTS

| | | | |
|---|---|---|---|
| 7,467,335 | B2 | 12/2008 | Otto et al. |
| 2003/0043434 | A1* | 3/2003 | Brachmann et al. .......... 359/158 |
| 2005/0053384 | A1 | 3/2005 | Kim et al. |
| 2007/0006053 | A1* | 1/2007 | Otto et al. ..................... 714/700 |

FOREIGN PATENT DOCUMENTS

| | | |
|---|---|---|
| JP | 4-222135 A | 8/1992 |
| JP | 7-95247 A | 4/1995 |
| JP | 2004-228922 | 8/2004 |
| JP | 2005-86823 | 3/2005 |
| WO | WO-2007-005686 A1 | 1/2007 |

OTHER PUBLICATIONS

Fairhurst, Gorry. AMI (Alternate Mark Inversion), Jan. 10, 2011, http://www.erg.abdn.ac.uk/~gorry/eg3561/phy-pages/ami.html (website, accessed on Dec. 18, 2011).*
Japanese Office Action mailed Apr. 24, 2012 for corresponding Japanese Application No. 2008-018885, with Partial English-language Translation.

\* cited by examiner

*Primary Examiner* — Shuwang Liu
*Assistant Examiner* — David Huang
(74) *Attorney, Agent, or Firm* — Fujitsu Patent Center

(57) ABSTRACT

According to an aspect of an embodiment, a communication system includes a transmission apparatus with a coding section that generates multi-level-coded signals and transmits the multi-level-coded signals; and a deskew signal generation section that generates and transmits a deskew signal related to the multi-level-coded signals. The communication system also includes a receiving apparatus with a decoding section that decodes the multi-level-coded signals to generate decoded signals, and a deskew processing section that performs deskew processing for compensating skew among the decoded signals of the multiple channels. The deskew signal generation section generates the deskew signal that has been framed by extracting a part of the data from each of the channels of the input signals, adding framing data for enabling a receiving apparatus to recognize which channel the extracted data has been extracted from, and performing rate conversion.

1 Claim, 17 Drawing Sheets

FIG. 7
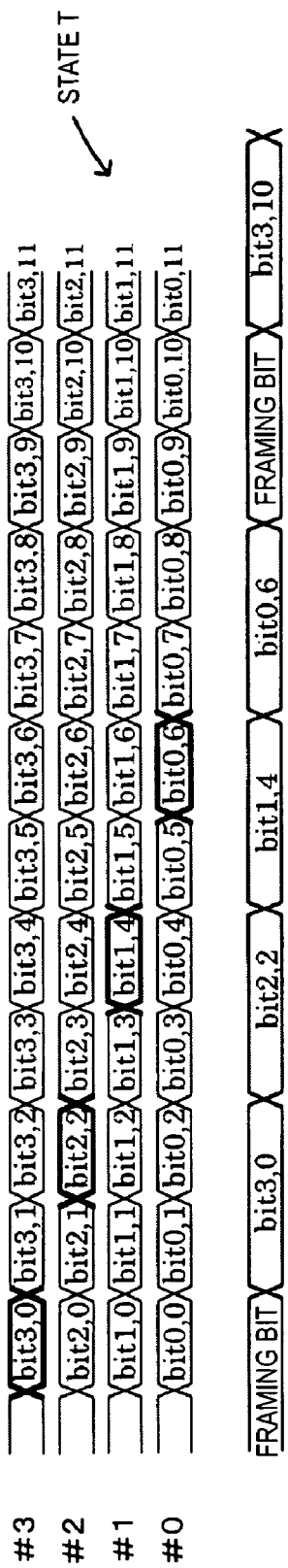
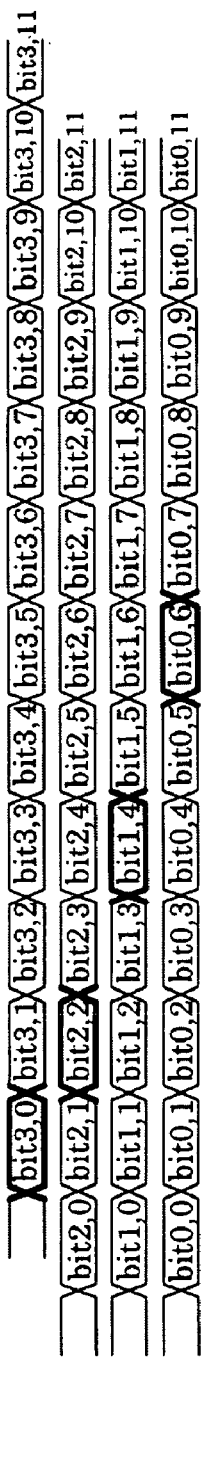

COMMUNICATION SYSTEM

CROSS-REFERENCE TO RELATED APPLICATIONS

This application is based upon and claims the benefit of priority from the prior Japanese Patent Application No. 2008-018885, filed on Jan. 30, 2008, the entire contents of which are incorporated herein by reference.

BACKGROUND

1. Field

The embodiments discussed herein are directed to a communication system. The embodiments discussed herein include a communication system in which parallel transmission is performed between transmission and receiving sides.

2. Description of the Related Art

With the spread of broadband services represented by services via the Internet, a massive amount of digital data is handled in communication networks. Accordingly, data transmission rates and bit rates are increasingly higher. Therefore, there is increasingly a demand for a technique for stabilizing a high-speed signal for transmission.

In general, in the case of transmitting a high bit rate signal between modules or ICs or on a backboard, parallel transmission is performed in which a serial signal is converted to parallel signals and transmitted.

For example, in the field of high-speed optical communication, an interface technique called SFI-5 (Serdes (serializer/deserializer) Framer Interface-5) has been put to practical use. The SFI-5 is a standard for an interface between an optical module and a signal processing LSI or between signal processing LSIs specified by OIF (Optical Internetworking Forum), and a signal transmission range of approximately 40 to approximately 50 Gbps is covered by the standard.

FIG. 17 illustrates an optical communication circuit for which an SFI-5 compliant interface is used. The figure illustrates a schematic configuration of an optical communication circuit 60 for performing approximately 40 Gbps optical communication. The optical communication circuit 60 includes a framer 61, a Serdes section 62, and an optical module 63 (the framer is an LSI for converting an outgoing signal to a transmission frame for a particular network, for example, by converting an Ethernet format signal to a SONET/SDH format signal and outputting the signal, or by converting a SONET/SDH format signal to an Ethernet format signal and outputting the signal). Ethernet is a registered trademark.

When an optical signal is transmitted, signals generated by the framer 61 are transmitted to the Serdes section 62 via multiple transmission lines, and the Serdes section 62 converts the parallel signals to a serial signal. The optical module 63 converts the serial electrical signal to an optical signal, and it outputs an approximately 40 Gbps optical signal via an optical fiber.

Although payload capacity is the essentially same, there may be many different transmission speeds by employing different modulation formats, for example SONET/SDH, Ethernet, OTN, etc. An SFI-5 compliant interface is applied between the framer 61 and the Serdes section 62, and an amount of information corresponding to a total of approximately 40 Gbps is transmitted with the use of sixteen 2.5 Gbps signal lines. As the method for coding exchanged signals, the NRZ (non return to zero) is used in which binary signals transmitted between the sections are indicated with the use of two electrical levels (for example, positive and zero electrical levels).

When parallel transmission is performed, skew ("skew": propagation delay time difference) occurs among the parallel signals. Therefore, an approximately 2.5 Gbps signal line for deskew is added to suppress the skew. A signal receiving side performs clock recover control with the use of the deskew channel (control for extracting a reproduction clock from the deskew channel), and then aligns the phases of the parallel signals to correspond to one another.

In the SFI-5 as described above, NRZ parallel transmission is performed with the use of sixteen 2.5 Gbps signal lines to handle approximately 40 Gbps transmission. However, an interface method called SFI-5 Phase 2 is also specified by OIF (Optical Internetworking Forum) in which approximately 40 Gbps NRZ parallel transmission is performed with four signal lines (four signal lines plus one deskew signal line in total) by reducing the number of signal lines and increasing the capacity of one signal line to approximately 10 Gbps to enlarge the implementation area for parts.

As a conventional parallel transmission technique, there are proposed techniques for adjusting differences among timings of serial input data of multiple systems by a deskew circuit with a reference signal used as a base, and for converting the timing-adjusted multiple input data to a serial signal by a multiplexer (see Patent Document 1).

Patent Document 1: Japanese Patent Laid-Open No. 2004-228922 (Paragraph Nos. [0011] to [0014] and FIG. 1)

For the current high-speed communication networks, an approximately 40 Gbps communication system has been developed. However, research and development of approximately 100 to 160 Gbps high-speed transmission has been promoted to realize a higher bit rate.

In the case of performing parallel transmission in such high-speed transmission of approximately 100 Gbps or more, the number of parallelized signals is increased to decrease the transmission rate per channel. However, it is not possible to greatly increase the number of parallelized signals because doing so may cause problems such as an increase in space of implementation of transmission lines, an increase in the number of pins of connectors, and an increase in the number of I/Os of an IC.

Consequently, since an increase in the number of parallelized signals is limited even in the case of performing parallel transmission, the transmission capacity per transmission line may be large in the case of high-speed transmission of approximately 100 Gbps or more. Therefore, if a coding method using a broad spectrum bandwidth (frequency bandwidth) like the NRZ used in the SFI-5 is applied to high-speed transmission of approximately 100 Gbps or more, attenuation and intercode interference increase and signals deteriorate, so that codes cannot be correctly transmitted.

Accordingly, applying a multi-level code with a narrow spectrum bandwidth, especially a duo binary code which can be easily code-converted, has been considered. The duo binary code indicates a binary signal to be transmitted using three electrical levels (positive, zero, and negative electrical levels). The duo binary code is not easily subject to intercode interference because the width of the spectrum bandwidth is half or less of the width of the NRZ.

For the reasons described above, for high-speed transmission of approximately 100 to 160 Gbps, both coding of a data channel using a duo binary code, which enables an increase in the transmission rate, and parallel transmission of duo binary-coded signals have been studied.

For deskew processing, a clock is extracted by performing clock recovery control of a duo-binary-coded deskew channel, and phase adjustment of multiple duo-binary signals transmitted in parallel is performed with the use of the extracted clock.

However, although a duo-binary signal has an advantage that the spectrum band width is narrow, there is a problem that, if a circuit is configured so that a duo-binary-coded signal is used as a deskew signal and deskew processing is performed by extracting a clock from the deskew channel as is done conventionally, then the circuit scale is complicated and power consumption increases.

Furthermore, in the case of performing control such as clock recovery from a duo-binary-coded deskew signal, control such as double over-sampling and 8B10B coding may be required, and so there is a possibility that the circuit configuration may become further complicated.

SUMMARY

According to an aspect of an embodiment, a communication system comprising: a transmission apparatus including: a coding section which generates multi-level-coded signals of the same number of channels from input signals of multiple channels and transmits the multi-level-coded signals in parallel; and a deskew signal generation section which generates and transmits a deskew signal related to the multi-level-coded signals; and a receiving apparatus including: a decoding section which receives and decodes the multi-level-coded signals to generate decoded signals; and a deskew processing section which receives the deskew signal and performs deskew processing for compensating skew among the decoded signals of the multiple channels; wherein the deskew signal generation section generates the deskew signal that has been framed, by extracting a part of data from each of the channels of the input signals, adding framing data for enabling a receiving apparatus to recognize which channel the extracted data has been extracted from, and performing rate conversion.

BRIEF DESCRIPTION OF THE DRAWINGS

FIG. 7 illustrates skew compensation;

DETAILED DESCRIPTION OF THE PREFERRED EMBODIMENTS

Figure 1:
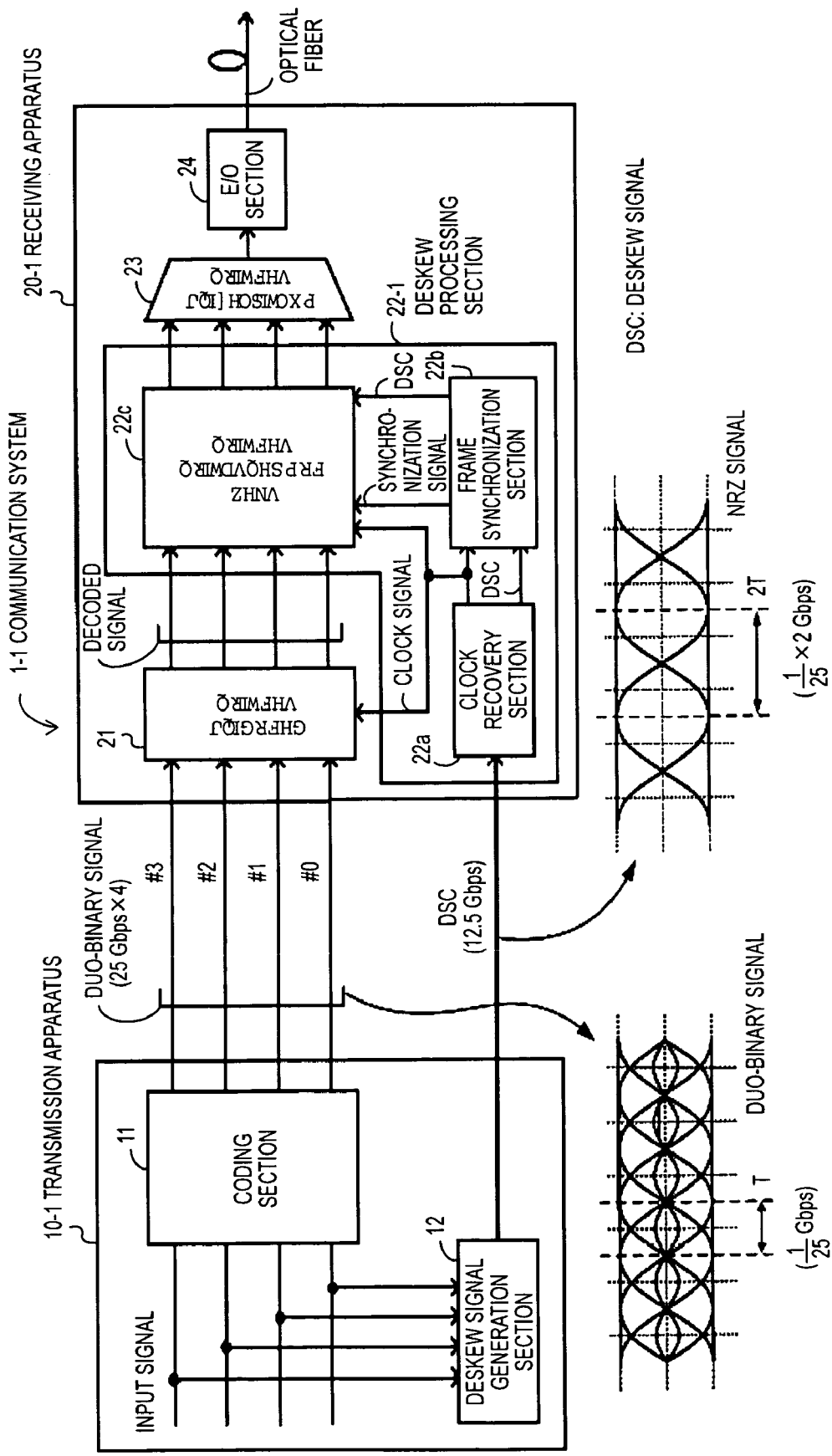
FIG. 1 illustrates a configuration example of a communication system.

An embodiment of the present invention will be described with reference to the drawings. FIG. 1 illustrates a configuration example of a communication system. A communication system 1-1 of a first embodiment includes a transmission apparatus 10-1 and a receiving apparatus 20-1, and is a system in which parallel transmission is performed between the transmission and receiving apparatuses. In the configuration of apparatuses described below, connection relationships among control lines for a clock signal and the like are only examples, and any configuration is possible depending on the combination of hardware.

The transmission apparatus 10-1 includes a coding section 11 and a deskew signal generation section 12. The coding section 11 codes input signals of multiple channels to generate multi-level-coded signals of the same number of channels (data channels) and to transmit the multi-level-coded signals in parallel. The deskew signal generation section 12 generates one deskew signal (DSC) for suppressing skew among the multi-level-coded signals and transmits it to the receiving apparatus 20-1.

The coding section 11 generates, from an input signal, a multi-level-coded signal in which one code takes three or more levels, and generates a binary-coded signal in which one code takes two levels. Here, it is assumed that the input signal is an NRZ signal, and that the coding section 11 generates four channels of duo-binary signals, three-level-coded signals in which one code takes three levels, from four channels of NRZ signals and transmits the duo-binary signals in parallel. It is assumed that the transmission rate of the duo-binary signal of one channel is approximately 25 Gbps, and therefore, transmission of approximately 100 Gbps (=25 Gbps×4) is performed in total.

On the other hand, the deskew signal generation section 12 extracts a part of the data from each of the channels of the NRZ signals which are input signals. That is, it extracts data from the NRZ signal of channel #0, extracts data from the NRZ signal of channel #1, extracts data from the NRZ signal of channel #2, and extracts data from the NRZ signal of channel #3.

Then, the deskew signal generation section 12 adds framing data for enabling a receiving side to recognize which channel the extracted data has been extracted from. Furthermore, the deskew signal generation section 12 performs rate conversion so that the transmission rate is lower than the transmission rate of the duo-binary signal of one channel, generates a framed NRZ-coding-format deskew signal, and outputs the deskew signal to the receiving apparatus 20-1. The transmission rate of the deskew signal may be converted so as to be, for example, 12.5 Gbps, which is ½ of 25 Gbps of the duo-binary signal.

The receiving apparatus 20-1 has a decoding section 21, a deskew processing section 22-1, a multiplexing section 23, and an E/O section 24. The deskew processing section 22-1 includes a clock recovery section 22a, a frame synchronization section 22b, and a skew compensation section 22c. The deskew processing section 22-1 receives a deskew signal and performs deskew processing for compensating skew among decoded signals of the channels #0 to #3.

Upon receiving a deskew signal, the clock recovery section 22a extracts a clock signal from the deskew signal. Then, the clock recovery section 22a transmits the clock signal to the decoding section 21 and the skew compensation section 22c, and transmits the clock signal and the deskew signal to the frame synchronization section 22b.

The decoding section 21 receives and decodes the duo-binary signals of the channels #0 to #3 to generate decoded signals. Here, the decoding section 21 receives the approximately 25 Gbps duo-binary signals of the four channels, decodes duo-binary codes to the original NRZ codes based on the clock signal synchronized with the duo-binary signals to generate approximately 25 Gbps NRZ decoded signals of four channels, and outputs the signals. The clock signal extracted from the deskew signal is approximately 12.5 Gbps. Therefore, if a 25 Gbps clock is required according to the hardware configuration of the decoding section 21, performing the decoding processing using a doubled clock signal is possible by providing a function such as a clock doubler within the decoding section 21.

The frame synchronization section 22b detects the framing data from the deskew signal, generates a synchronization signal, and transmits the synchronization and the deskew signal to the skew compensation section 22c. The skew compensation section 22c recognizes the frame configuration of the deskew signal from the synchronization signal. Then, the skew compensation section 22c compares the data of the decoded signal of each channel and the data included in the deskew signal. By comparing the data, a duo-binary signal with a shifted phase may be detected so that the phase states of duo-binary signals of the multiple channels based on the deskew signal transmitted from the transmission apparatus 10-1 may become essentially the same on the receiving apparatus 20-1 side. Where a phase shift has occurred, phase adjustment is performed for the duo-binary signal to compensate skew (to be described later with reference to FIG. 7).

The multiplexing section 23 generates a multiplexed signal by multiplexing the decoded signals of the multiple channels after the deskew signal processing into one signal. The E/O section 24 converts the multiplexed signal to an optical signal and outputs an approximately 100 Gbps optical signal. The optical signal is propagated through an optical fiber which is optically connected to the E/O section 24. The communication system 1-1 can be applied to an optical transmission apparatus such as, for example, an approximately 100 Gbps transponder.

Figure 2:
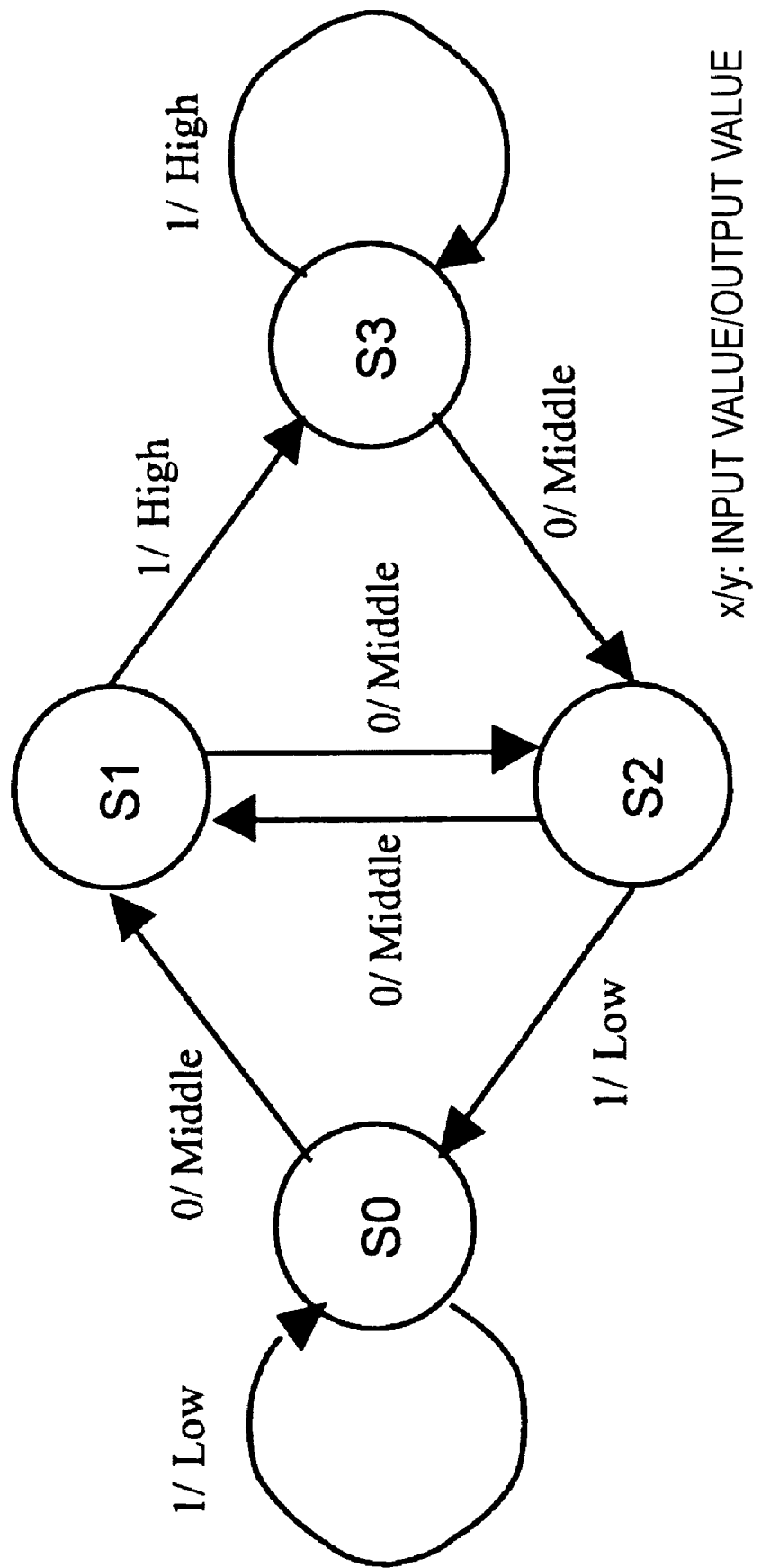
FIG. 2 illustrates state transition of duo-binary coding.

Next, generation of a duo-binary signal will be described. FIG. 2 illustrates duo-binary coding. The code output of the coding section 11 takes three levels of High, Middle and Low, and the coding section 11 performs coding processing in accordance with state transition in which four states are included.

The four states are assumed to be states S0 to S3. If an input level is 1 when the current state is the state S0, then the code output is Low, and the state transitions to the same state S0. If the input level is 0, then the code output is Middle, and the state transitions to the state S1.

If the input level is 1 when the current state is the state S1, then the code output is High, and the state transitions to the state S3. If the input level is 0, then the code output is Middle, and the state transitions to the state S2.

If the input level is 1 when the current state is the state S2, then the code output is Low, and the state transitions to the state S0. If the input level is 0, then the code output is Middle, and the state transitions to the state S1.

If the input level is 1 when the current state is the state S3, then the code output is High, and the state transitions to the same state S3. If the input level is 0, then the code output is Middle, and the state transitions to the state S2.

By performing coding processing of the binary NRZ-format input signal in accordance with such state transitions, a duo-binary signal in which one code takes the three levels of High, Middle and Low is generated.

Figure 3:
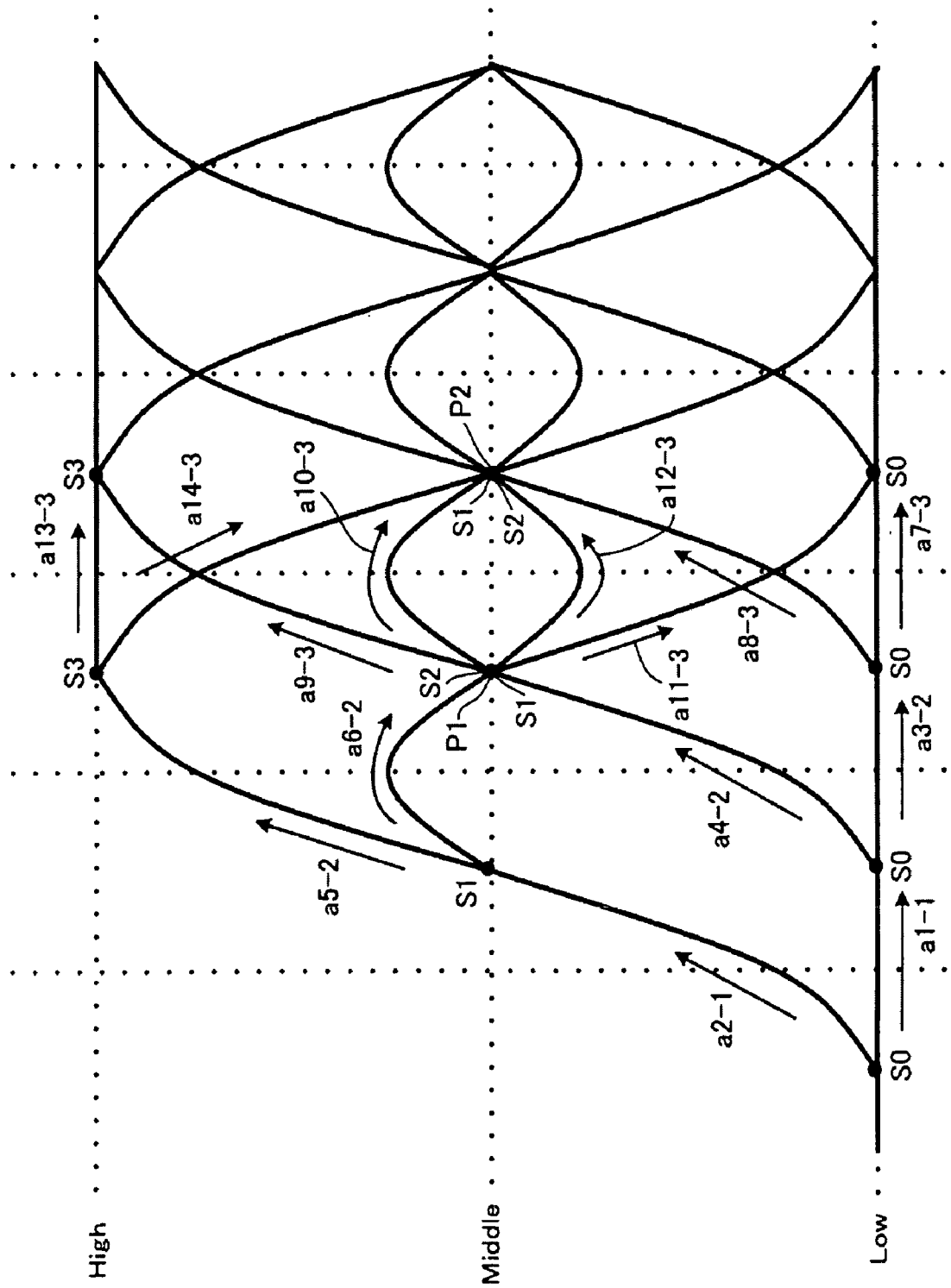
FIG. 3 illustrates a duo-binary signal generation process.

FIG. 3 illustrates a duo-binary signal generation process. The figure illustrates the process in which the waveform of a duo-binary signal is generated based on the state transition diagram illustrated in FIG. 2. The state S0 is considered to be the start point of coding.

[a1-1] If an input level (the level of an input signal inputted to the coding section 11) is 1 when the state is the state S0, then an output level (the level of a duo-binary signal) is Low, and the state transitions to the state S0.

[a2-1] If the input level is 0 when the state is the state S0, then the output level is Middle, and the state transitions to the state S1.

[a3-2] If the input level is 1 when the state is the state S0, then the output level is Low, and the state transitions to the state S0.

[a4-2] If the input level is 0 when the state is the state S0, then the output level is Middle, and the state transitions to the state S1.

[a5-2] If the input level is 1 when the state is the state S1, then the output level is High, and the state transitions to the state S3.

[a6-2] If the input level is 0 when the state is the state S1, then the output level is Middle, and the state transitions to the state S2.

[a7-3] If the input level is 1 when the state is the state S0, then the output level is Low, and the state transitions to the state S0.

[a8-3] If the input level is 0 when the state is the state S0, then the output level is Middle, and the state transitions to the state S1.

[a9-3] If the input level is 1 when the state is the state S1, then the output level is High, and the state transitions to the state S3.

[a10-3] If the input level is 0 when the state is the state S1, then the output level is Middle, and the state transitions to the state S2.

[a11-3] If the input level is 1 when the state is the state S2, then the output level is Low, and the state transitions to the state S0.

[a12-3] If the input level is 0 when the state is the state S2, then the output level is Middle, and the state transitions to the state S1.

[a13-3] If the input level is 1 when the state is the state S3, then the output level is High, and the state transitions to the state S3.

[a14-3] If the input level is 0 when the state is the state S3, then the output level is Middle, and the state transitions to the state S2 (in the above state transition, both of the states S1 and S2 exist at points P1 and P2). Subsequently, the state transition continues in a similar flow, and a duo-binary signal having a waveform as illustrated in FIG. 3 is generated.

Figure 4:
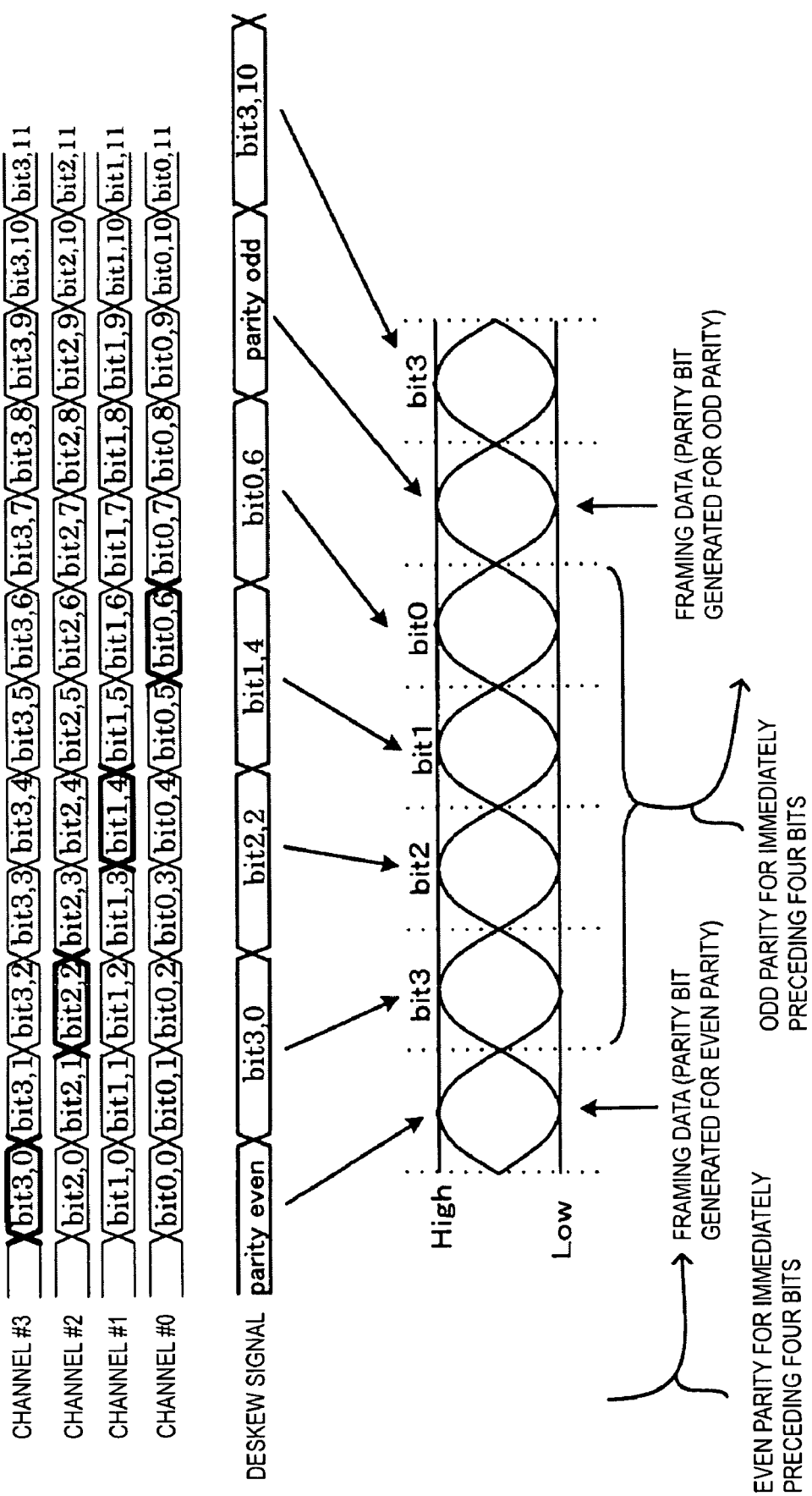
FIG. 4 illustrates how a deskew signal is generated.

Next, generation of a deskew signal will be described. FIG. 4 illustrates how a deskew signal is generated. The data processing unit may be any length. In the description below, it is assumed that processing is performed for each bit. In the figure, the expression of "bit x,y" indicates one-bit data, wherein x denotes a channel number, and y denotes a number sequentially given along the time axis starting from the left side.

The deskew signal generation section 12 extracts a part of the data from each of the channels #0 to #3 of the NRZ-format input signals, each channel having a rate of approximately 25 Gbps. Then, the deskew signal generation section 12 converts the rate to be ½ to generate an NRZ signal with a bit rate reduced to approximately 12.5 Gbps.

For example, by extracting bit3,0 from the channel #3 and performing rate conversion to ½, extracting bit2,2 from the channel #2 and performing rate conversion to ½, extracting bit1,4 from the channel #1 and performing rate conversion to ½, extracting bit0,6 from the channel #0 and performing rate conversion to ½, and then arranging these bit data in the order of extraction, one NRZ signal is generated (the one-bit width after the rate conversion is double the one-bit width of the input signal).

The deskew signal generation section 12 adds framing data for enabling a receiving side to recognize which channel the extracted bit data has been extracted from (if the receiving side can detect the framing data, which channel bit data the bit data is from can be recognized from the order of arrangement of bit data).

Here, a parity bit is used as the framing data. A parity bit for satisfying even parity or odd parity is generated based on the level of extracted bit data. Parity bits generated for even parity and parity bits generated for odd parity are alternately arranged as framing data.

Here, when the bit data extracted from the channel #3 is denoted by bit3, the bit data extracted from the channel #2 is denoted by bit2, the bit data extracted from the channel #1 is denoted bit1, and the bit data extracted from the channel #0 is denoted by bit0, a one-bit parity bit is generated with the four bit data bit0 to bit3.

In the case of generating a parity bit for odd parity, the parity bit is determined so that the total of ones included in bit0 to bit3 and the parity bit becomes an odd number. For example, if only bit3 is 1, and bit2, bit1, and bit0 are 0, then, the parity bit for odd parity is determined to be 0.

In the case of generating a parity bit for even parity, the parity bit is determined so that the total of ones included in bit0 to bit3 and the parity bit becomes an even number. For example, if only bit3 is 0, and bit2, bit1 and bit0 are 1, then, the parity bit for even parity is determined to be 1.

That is, multiple data extracted from the channels of the input signals of channels #1 to #n the kth time are indicated as data d1,k to dn,k. Here, dx,y means data extracted from the input signal of the channel #x the yth time. Parity data is generated based on the levels of the data d1,k to dn,k in the parity generation method for odd parity, and the generated appropriate parity data is inserted at the end positions of the data d1,k to dn,k as framing data.

Furthermore, as for data d1,(k+1) to dn,(k+1) extracted the (k+1)th time, parity data is generated based on the levels of the data d1,(k+1) to dn,(k+1) in the parity generation method for even parity, and the generated appropriate parity data is inserted at the end positions of the data d1,(k+1) to dn,(k+1) as framing data.

In this way, the parity data generated for odd parity and the parity data generated for even parity are alternately arranged as framing data to generate a framed deskew signal.

By generating such a deskew signal with framing data, the frame synchronization section 22*b* on a receiving side can detect a frame, and it is possible for the receiving side to recognize which channel the extracted bit data has been extracted from. That is, if framing data can be detected, it can be recognized that, for example, the bit arranged immediately after the framing data is a bit extracted from the channel #3. Furthermore, it is also possible to perform error detection by parity check within one frame.

Figure 5:
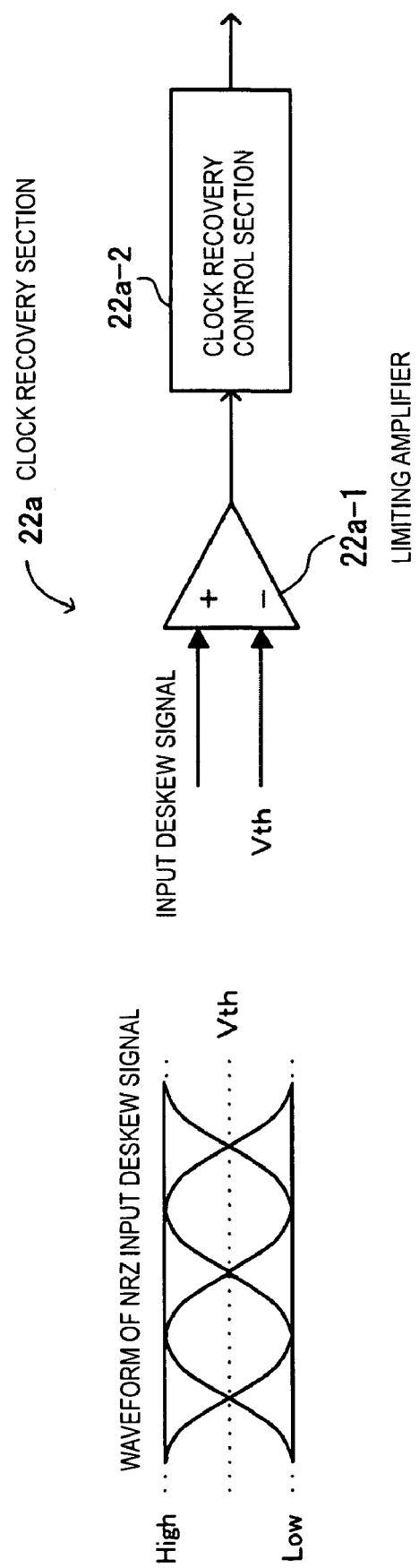
FIG. 5 illustrates the schematic configuration within a clock recovery section.

Next, the clock recovery section 22*a* will be described. FIG. 5 illustrates the schematic configuration within the clock recovery section 22*a*. The clock recovery section 22*a* includes a limiting amplifier 22*a*-1 and a clock recovery control section 22*a*-2. A clock recovery circuit using a PLL (phase-locked loop) or a narrow band filter may be used in the clock recovery control section 22*a*-2.

Figure 6:
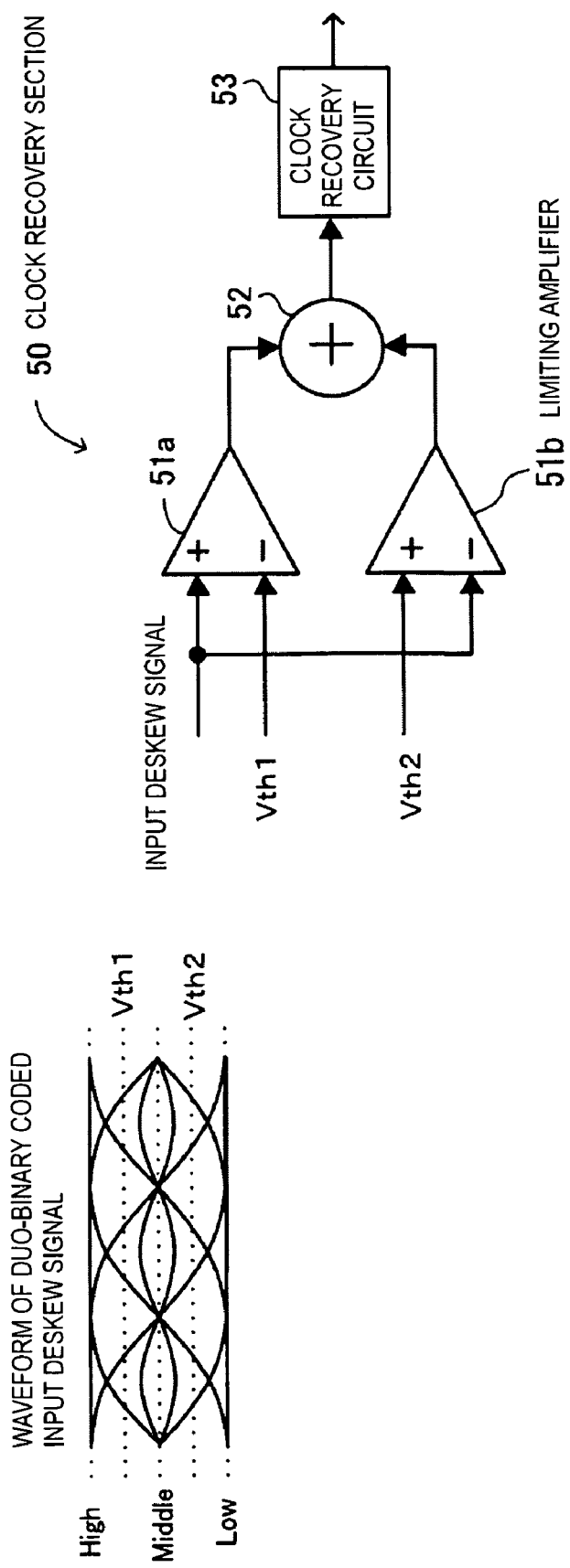
FIG. 6 illustrates the schematic configuration of the vicinity of a clock recovery section for receiving a duo-binary-coded signal.

FIG. 6 illustrates the schematic configuration of the vicinity of a clock recovery section for receiving a duo-binary-coded signal. FIG. 6 illustrates a conventional circuit configuration in which a duo-binary-coded deskew signal is received to perform clock recovery control. A conventional clock recovery section 50 includes two limiting amplifiers 51*a* and 51*b*, an adder 52, and a clock recovery circuit 53.

Here, in order to secure the dynamic range of an input signal, both the clock recovery section 22*a* and the clock recovery section 50 are provided with one or more limiting amplifiers in front of the components for performing clock recovery. However, because the clock recovery section 22*a* that receives an NRZ deskew signal only has to identify High or Low, only one threshold Vth is sufficient. Therefore, one limiting amplifier 22*a*-1 is provided.

On the other hand, the clock recovery section 50 which receives a duo-binary-coded deskew signal having three levels performs identification of High or Middle and identification of Middle or Low, and therefore, two thresholds Vth1 and Vth2 are required. Accordingly, it is necessary to provide two limiting amplifiers 51*a* and 51*b* as illustrated in FIG. 6.

Furthermore, the clock recovery section 50 requires an adder 52 for adding output signals from the limiting amplifiers 51*a* and 51*b*, and further requires a circuit and the like for adjusting delay time to prevent jitter from increasing when the output signals from the limiting amplifiers 51*a* and 51*b* are added.

In the case of performing deskew processing using a duo-binary-coded deskew channel with the same bit rate as that of data channels transmitted in parallel, as in FIG. 6, limiting amplifiers are added in front of the clock recovery circuit. Furthermore, a circuit for adjusting delay time, an adder and the like are also required. However, in the case of performing deskew processing using an NRZ-coded deskew channel the bit rate of which has been reduced to ½ or less as in FIG. 5, the circuit scale can be reduced. Therefore, power consumption can also be reduced.

Next, skew compensation using a deskew signal will be described. FIG. 7 illustrates the skew compensation. It is assumed that the phase relationship between the data channels of the channels #0 to #3 transmitted from the transmission apparatus 10-1 and a deskew signal is a state T, and that, when the data channels arrive at the receiving apparatus 20-1, the data channel of the channel #3 arrives later than the data channels of the other channels by one bit, and the receiving is performed at a phase of a state R.

The skew compensation section 22*c* recognizes in advance the phase relation among the multiple channels, based on a deskew signal, transmitted from the transmission apparatus 10-1. When the configuration of one frame is recognized from a synchronization signal transmitted from the frame synchronization section 22*b* and the deskew signal, the phase of the data channel of each channel and the phase of the deskew signal are compared. When a channel with a phase which is different from the data phase of the deskew signal is detected by the comparison control, control is performed so that the phases of the data channels #0 to #3 become substantially the same as the phases at the time when they were transmitted, by performing phase adjustment on the channel with the phase which has shifted to compensate skew.

In the case of FIG. 7, a one-bit phase shift between bit3,0 of the channel #3 at the time of transmission and bit3,0 in the deskew signal is detected (the channel #3 has arrived at the receiving apparatus 20-1 in a delay corresponding to one bit). As phase adjustment, control is performed so that the phases of all the data channels #0 to #3 become the same as the phases of the data channels at the time of transmission, for example, by shifting the phases of the data channels of the channels #0 to #2 to the right by one bit (in a delay corresponding to one bit).

The internal configuration of the skew compensation section 22c is such that, for example, a shift register is provided for each channel, and data shifted at a constant timing are held in the registers. By selecting a register to output data at a desired phase timing and acquiring data outputted from the selected register, phases may be aligned with the phases of the other channels.

As described above, the transmission apparatus 10-1 in the communication system 1-1 is configured so that, for information data, the information data is duo-binary-coded, and duo-binary signals of multiple channels are generated and transmitted in parallel. For a deskew signal, an NRZ-coded signal with a bit rate of 1/N (N≧2) of the duo-binary signal is used as the deskew signal.

Thus, the circuit configuration of the receiving apparatus 20-1 is such that, at a bit rate lower than the bit rate of information data and based on an NRZ-coded deskew signal, clock recovery is performed to extract a clock, and deskew processing is performed. Therefore, in comparison with the conventional deskew processing circuit configuration (the circuit configuration in which deskew processing is performed based on a duo-binary-coded deskew signal at a similar high-speed transmission rate as information data), it is possible to reduce the circuit scale and power consumption.

Next, description will be made on a communication system of a second embodiment in which a deskew signal is generated with the use of the state transition described above with reference to FIG. 2. In the description below, the same reference numerals will be given to the same components as described above, and description of the components will be omitted.

Figure 8:
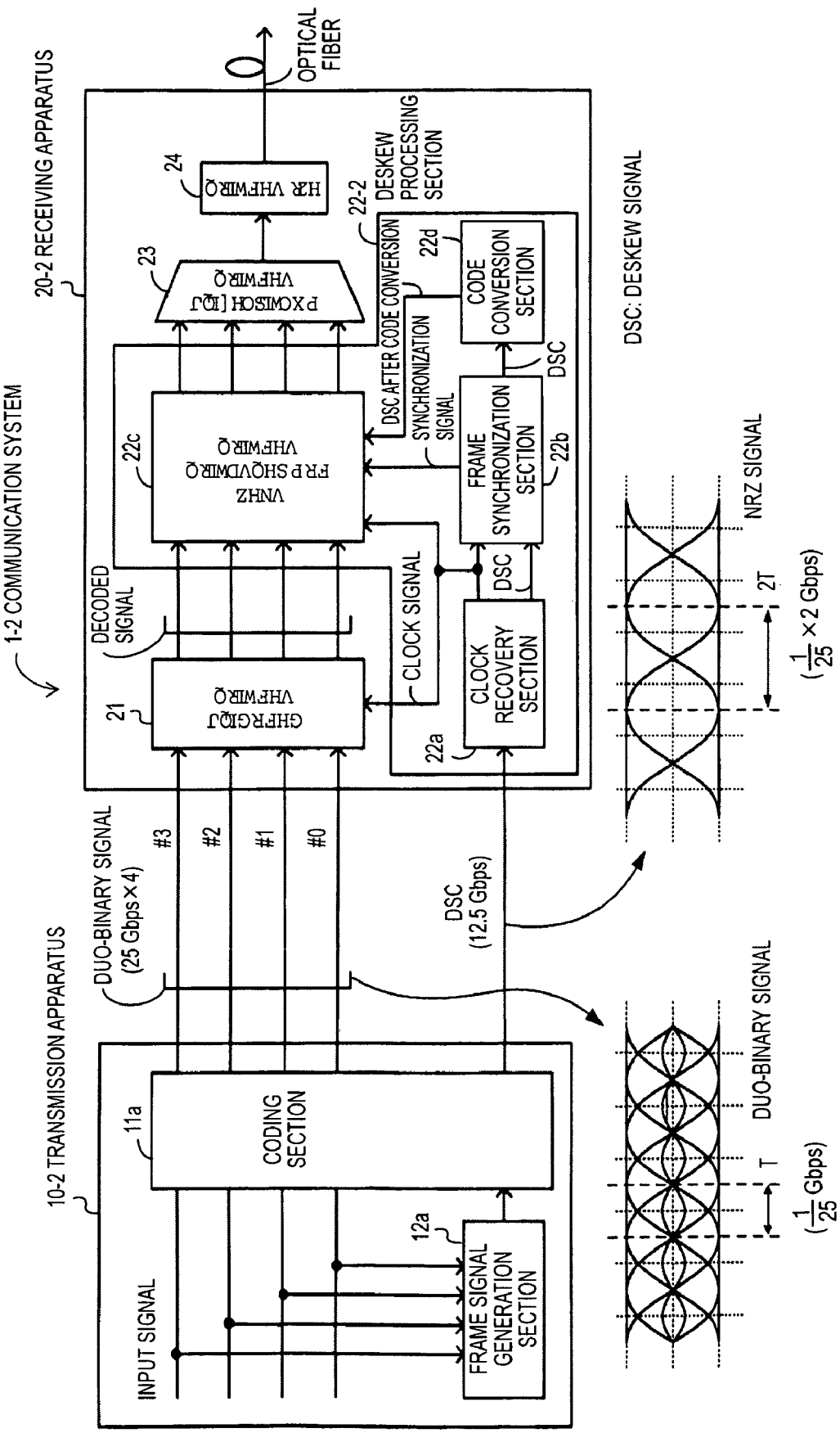
FIG. 8 illustrates the configuration of a communication system.

FIG. 8 is a diagram illustrating the configuration of a communication system. A communication system 1-2 of the second embodiment includes a transmission apparatus 10-2 and a receiving apparatus 20-2. The transmission apparatus 10-2 includes a coding section 11a and a frame signal generation section 12a.

The frame signal generation section 12a generates a frame signal by extracting a part of the data from each of the channels of input signals of multiple channels and adding framing data for enabling a receiving side to recognize which channel the extracted data has been extracted from. In this case, fixed levels are inserted between the extracted data and the frame signal is outputted.

The coding section 11a codes the input signals of the multiple channels to generate the same number of duo-binary signals and transmit the duo-binary signals in parallel. Furthermore, the coding section 11a codes a received frame signal to generate a deskew signal for suppressing skew among the duo-binary signals to be transmitted in parallel and transmits the deskew signal to the receiving apparatus 20-2.

It is assumed that the transmission rate of the duo-binary signal of one channel is approximately 25 Gbps, and transmission of approximately 100 Gbps (=25 Gbps×4) is performed as a whole. It is also assumed that the transmission rate of the deskew signal is approximately 12.5 Gbps, which is ½ of the transmission rate of the approximately 25 Gbps duo-binary signal.

The receiving apparatus 20-2 includes a decoding section 21, a deskew processing section 22-2, a multiplexing section 23, and an E/O section 24. The deskew processing section 22-2 includes a clock recovery section 22a, a frame synchronization section 22b, a skew compensation section 22c, and a code conversion section 22d. The deskew processing section 22-2 receives a deskew signal and performs deskew processing for compensating skew among decoded signals of multiple channels #0 to #3. The code conversion section 22d performs code conversion of a deskew signal and transmits the code-converted deskew signal to the skew compensation section 22c (to be described below with reference to FIG. 12).

Here, the coding section 11a performs coding processing of input signals to generate duo-binary signals in accordance with the state transition described above with reference to FIG. 2. Furthermore, in the case of generating a deskew signal, coding processing of the frame signal in which fixed levels are inserted is performed with the use of the same state transition in FIG. 2 used when the duo-binary signals are generated, to binary-code (NRZ-code) the frame signal. Then, the rate is converted to be lower than the transmission rate of the duo-binary signal of one channel, and a framed NRZ-format deskew signal is generated.

Figure 9:
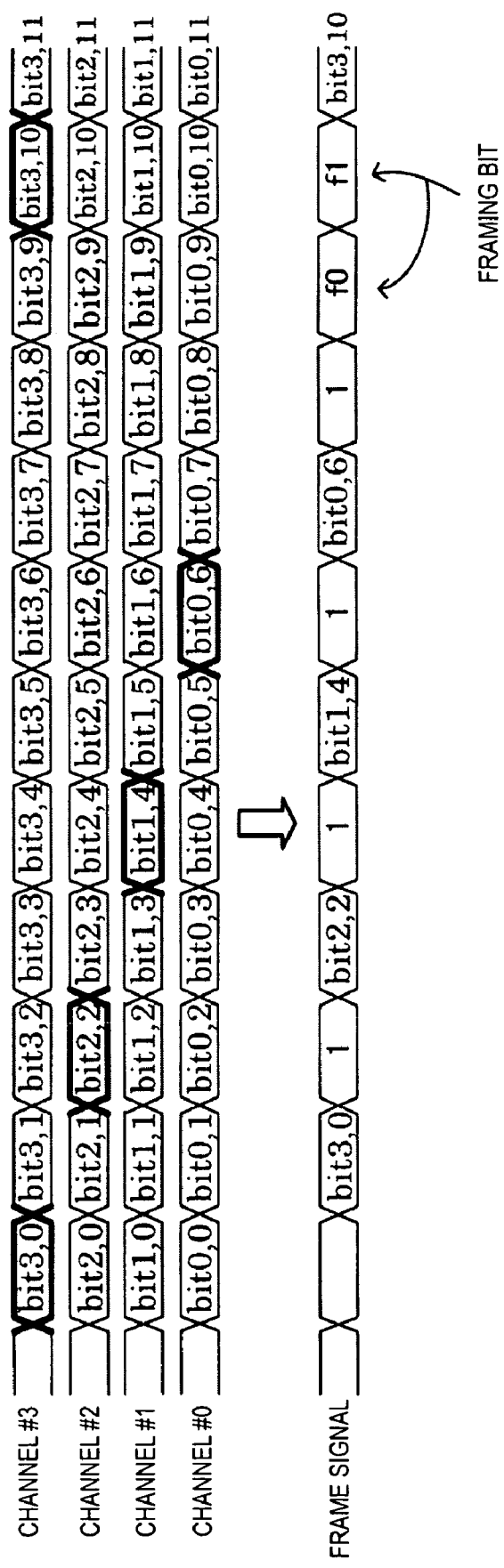
FIG. 9 illustrates how a frame signal is generated.

Next, generation of a frame signal will be described. FIG. 9 illustrates how a frame signal is generated. The frame signal generation section 12a extracts a part of the data from each of the channels #0 to #3 of the input signals, each channel having a rate of approximately 25 Gbps, and the frame signal generation section 12a inserts fixed levels between the extracted data. Furthermore, by adding framing data for enabling a receiving side to recognize which channel the extracted bit data has been extracted from, the frame signal generation section 12a generates one frame signal.

For example, bit3,0 is extracted from the channel #3; bit2,2 is extracted from the channel #2; bit1,4 is extracted from the channel #1; bit0,6 is extracted from the channel #0; and one-bit data of a fixed level 1 is arranged between bit3,0; bit2,2; bit1,4; and bit0,6. Then, framing bits are arranged and a frame signal is generated.

Figure 10:
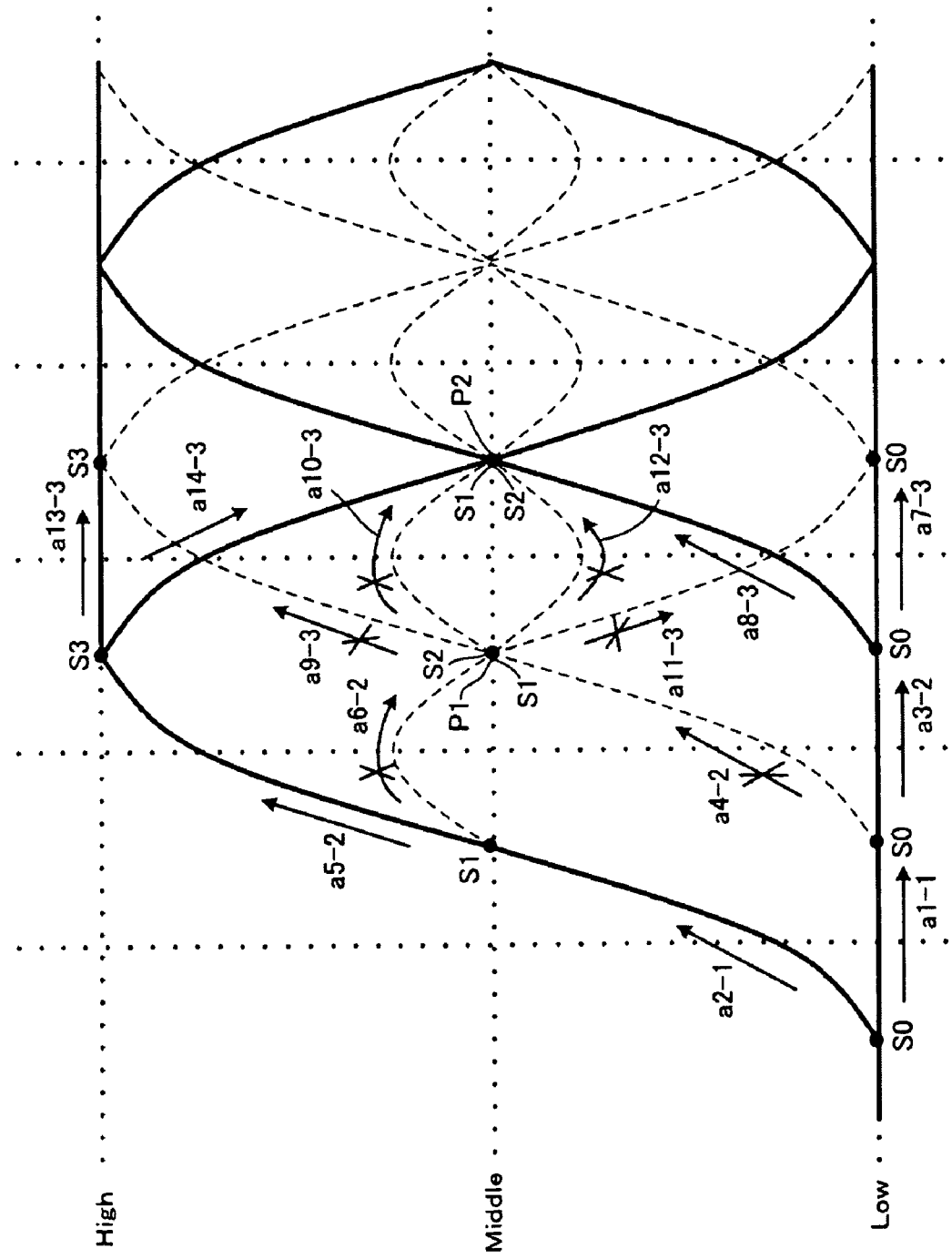
FIG. 10 illustrates a deskew signal generation process.

Next, generation of a deskew signal will be described. FIG. 10 illustrates a deskew signal generation process. The figure illustrates a process in which a waveform (the solid-line waveform in the figure) of an NRZ signal is generated by performing coding processing of the frame signal illustrated in FIG. 9 based on the state transition diagram for duo-binary coding illustrated in FIG. 2.

It is assumed that the coding start point is the state S0, and coding is started beginning with bit3,0. In comparison to FIG. 3, a waveform corresponding to a prohibited state transition (a waveform which is not actually generated) is indicated by dashed lines so that the prohibited state transition can be seen.

[a1-1] If the input level bit3,0 of the frame signal is 1 when the state is the state S0, then an output level is Low, and the state transitions to the state S0.

[a2-1] If the input level bit3,0 of the frame signal is 0 when the state is the state S0, then the output level is Middle, and the state transitions to the state S1.

[a3-2] Since the input level of the frame signal is 1 (fixed level) when the state is the state S0, the output level is Low, and the state transitions to the state S0.

[a4-2] Since the input level of the frame signal is only 1, transition of an arrow a4-2 illustrated in FIG. 3 does not occur.

[a5-2] Since the input level of the frame signal is 1 (fixed level) when the state is the state S1, the output level is High, and the state transitions to the state S3.

[a6-2] Since the input level of the frame signal is only 1, transition of an arrow a6-2 illustrated in FIG. 3 does not occur.

[a7-3] If the input level bit2,2 of the frame signal is 1 when the state is the state S0, then the output level is Low, and the state transitions to the state S0.

[a8-3] If the input level bit2,2 of the frame signal is 0 when the state is the state S0, then the output level is Middle, and the state transitions to the state S1.

[a9-3 to a12-3] Since a point P1 does not exist, transitions of arrows a9-3 to a12-3 illustrated in FIG. 3 do not occur.

[a13-3] If the input level bit2,2 of the frame signal is 1 when the state is the state S3, then the output level is High, and the state transitions to the state S3.

[a14-3] If the input level bit2,2 of the frame signal is 0 when the state is the state S3, the output level is Middle, and the state transitions to the state S2. By the state transition of the frame signal, in which fixed levels of 1 are inserted, continuing in a similar flow after that, an NRZ signal having a waveform as illustrated in FIG. 10 is generated.

That is, by inputting a frame signal for which an input level is limited, to a circuit for performing the same state transition control used to generate a duo-binary signal, which was used in FIG. 1, to perform duo-binary coding processing, an NRZ-format deskew signal is generated.

Figure 11:
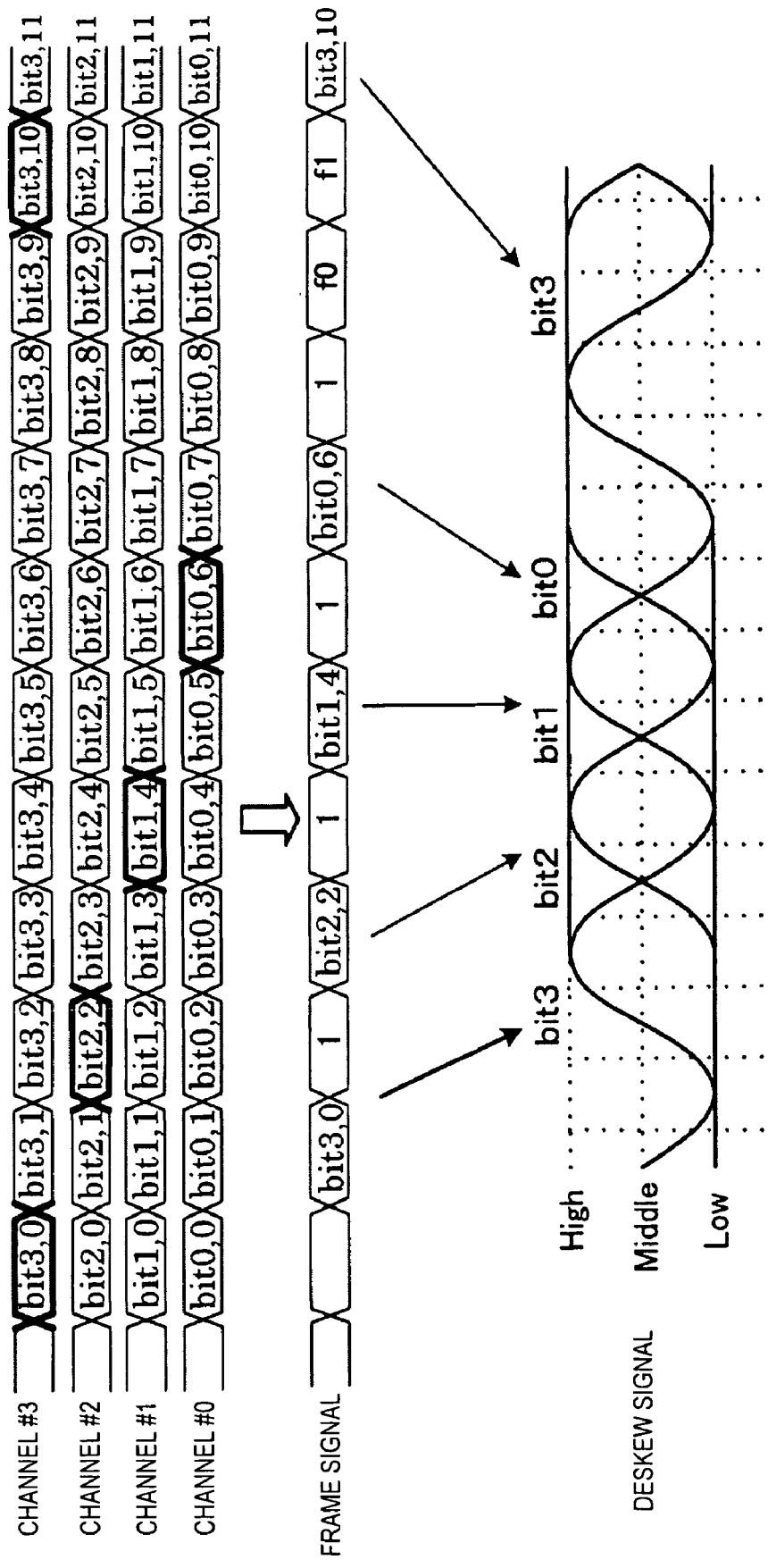
FIG. 11 illustrates how a frame signal is generated from input signals and how a deskew signal is generated from the frame signal.

FIG. 11 illustrates how a frame signal is generated from input signals and how a deskew signal is generated from the frame signal. By the state transitioning from any state to a particular state by two bits, a deskew signal is generated (the state of 0 transitions to the state of 0 or 1 by two bits; or the state of 1 transitions to the state of 0 or 1 by two bits.)

Next, the code conversion section 22d will be described. As described above, the transmission apparatus 10-2 performs duo-binary coding, which is three-level code conversion processing, of a binary frame signal to generate and transmit a deskew signal corresponding to an NRZ signal.

In this case, the level of the original frame signal and the level of a deskew signal obtained by performing duo-binary code conversion of the frame signal do not correspond to each other. For example, the level 0 of the original frame signal corresponds to the position of Middle of a generated deskew signal ([a2-1] in FIG. 10 and the like). Therefore, if the receiving apparatus 20-2 immediately recognizes the level of a received deskew signal as 0 or 1, an error occurs. Accordingly, the receiving apparatus 20-2 is required to perform code conversion of the deskew signal.

Figure 12:
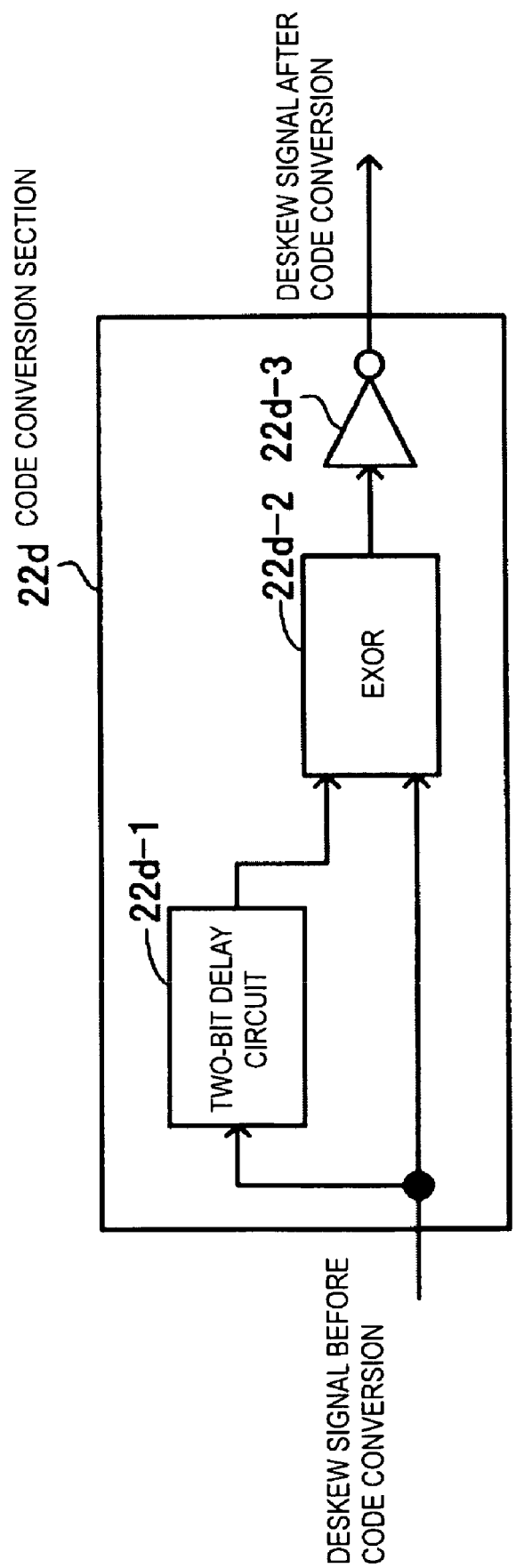
FIG. 12 illustrates the configuration of a code conversion section.

FIG. 12 illustrates the configuration of the code conversion section 22d. The code conversion section 22d includes a two-bit delay circuit 22d-1, an exclusive OR (EXOR) device 22d-2, and an inverter 22d-3. The code conversion rule is that the code is 0 if there is level transition from an immediately preceding bit, and the code is 1 if there is no level transition from an immediately preceding bit. The figure illustrates a configuration in which this conversion rule is realized by a logic circuit.

A deskew signal before being code-converted is inputted to one terminal of either the two-bit delay circuit 22d-1 or the EXOR device 22d-2. The deskew signal delayed by the two-bit delay circuit 22d-1 by two bits is inputted to the other terminal of the EXOR device 22d-2. The EXOR device 22d-2 performs an EXOR operation on the deskew signal with the deskew signal delayed by two bits and outputs it. The inverter 22d-3 inverts the output signal to generate a code-converted deskew signal and transmits the code-converted deskew signal to the skew compensation section 22c.

As described above, the transmission apparatus 10-2 of the communication system 1-2 performs duo-binary coding of the information data to generate duo-binary signals of multiple channels and transmit them in parallel. As for a deskew signal, the transmission apparatus 10-2 performs coding processing of a frame signal in which fixed levels are inserted with the use of the same state transition used to generate the duo-binary signal, and thereby, binary-codes the frame signal. Thus, the transmission apparatus 10-2 is configured to use an NRZ-coded signal with a bit rate of 1/N (N≧2) of the duo-binary signal as a deskew signal.

Thus, the circuit configuration of the receiving apparatus 20-2 is such that, at a bit rate lower than the bit rate of information data and based on an NRZ-coded deskew signal, clock recovery is performed to extract a clock, and deskew processing is performed. Therefore, in comparison to the conventional deskew processing circuit configuration (the circuit configuration in which deskew processing is performed based on a duo-binary-coded deskew signal at the same high-speed transmission rate as information data), it is possible to reduce the circuit scale and power consumption.

Furthermore, by duo-binary-coding a frame signal with a limited input level with the use of the same components as the components for duo-binary-coding data channels, a deskew signal is generated. That is, duo-binary signals and a deskew signal are generated and outputted from the same circuit. Thus, it is possible to cause the spectral characteristics and the like of the deskew signal and the data channels to correspond to each other. For example, it is possible to cause the rising or falling waveform of the data channels and the rising or falling waveform of the deskew signal to be essentially the same. Therefore, it is possible to further reduce the influence of skew.

Next, a communication system of a third embodiment will be described. In the third embodiment, a deskew signal is generated in which High levels and Low levels are cyclically arranged in accordance with a duo-binary coding rule, and a receiving side detects a frequency component (a clock signal) from the cyclical High levels and Low levels.

Figure 13:
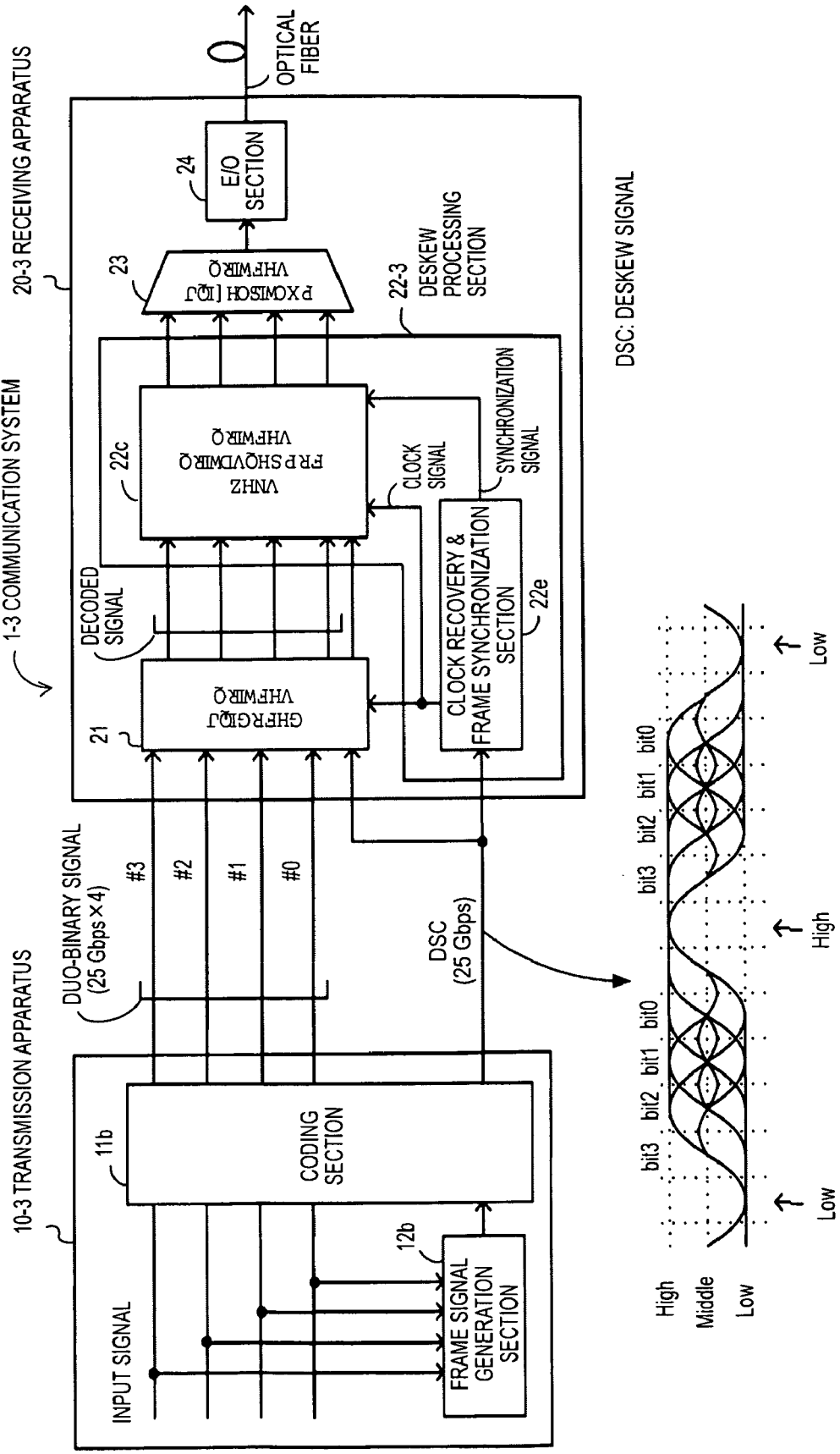
FIG. 13 illustrates the configuration of a communication system.

FIG. 13 illustrates the configuration of a communication system. A communication system 1-3 of the third embodiment includes a transmission apparatus 10-3 and a receiving apparatus 20-3. The transmission apparatus 10-3 includes a coding section 11b and a frame signal generation section 12b.

The frame signal generation section 12b generates a frame signal by extracting a part of the data from each of the channels of input signals of multiple channels and adding framing data for enabling a receiving side to recognize which channel the extracted data has been extracted from.

The coding section 11b codes the input signals of the multiple channels, generates duo-binary signals of the same number of channels, and transmits the duo-binary signals in parallel. Furthermore, the coding section 11b codes the frame signal it receives, generates a deskew signal for suppressing skew among the duo-binary signals to be transmitted in parallel, and transmits the deskew signal to the receiving apparatus 20-3.

It is assumed that the transmission rate of the duo-binary signal of one channel is approximately 25 Gbps, and therefore, transmission of approximately 100 Gbps (=25 Gbps×4) is performed as a whole. The transmission rate of the deskew signal is also essentially the same 25 Gbps as the duo-binary signals to be transmitted in parallel.

Here, when generating a deskew signal, the coding section 11b performs coding processing of the frame signal based on the state transition of duo-binary coding so that High and Low levels are cyclically arranged at the positions of framing data, and thereby generates a duo-binary-coded deskew signal having the same transmission rate as that of the duo-binary signal of one channel.

The receiving apparatus 20-3 includes a decoding section 21, a deskew processing section 22-3, a multiplexing section 23, and an E/O section 24. The deskew processing section 22-3 includes a clock recovery & frame synchronization section 22e and a skew compensation section 22c. The deskew processing section 22-3 receives a deskew signal and performs deskew processing for compensating skew among decoded signals of the multiple channels #0 to #3.

Figure 14:
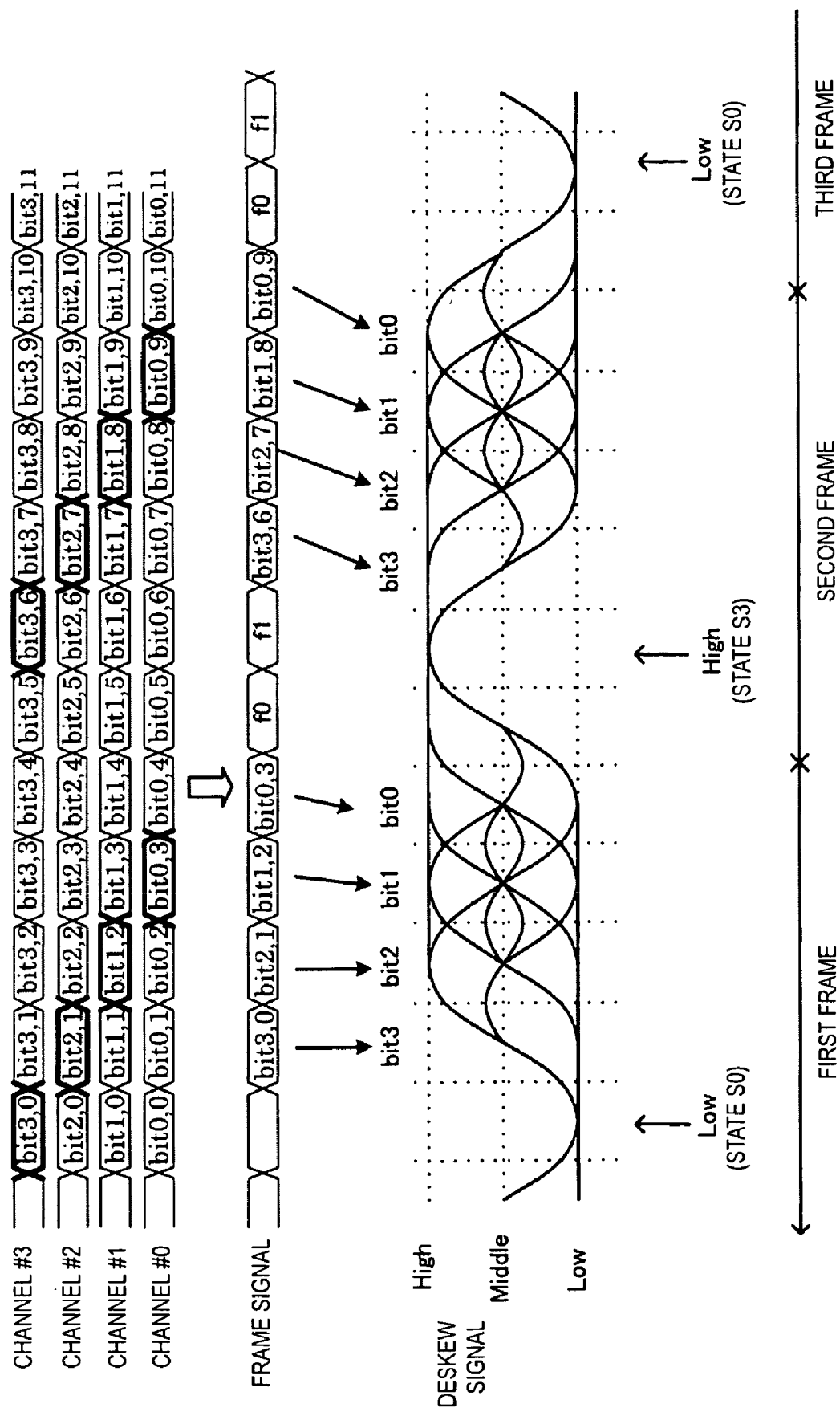
FIG. 14 illustrates how a frame signal is generated from input signals and how a deskew signal is generated from the frame signal.

Next, generation of a deskew signal will be described. FIG. 14 illustrates how a frame signal is generated from input signals and how a deskew signal is generated from the frame signal.

The frame signal generation section 12b extracts a part of the data from each of the channels #0 to #3 of the input signals, each channel having a rate of approximately 25 Gbps.

Furthermore, by adding framing data for enabling a receiving side to detect which channel the extracted bit data has been extracted from, the frame signal generation section 12b generates one frame signal.

As shown in FIG. 14, by extracting bit3,0 from the channel #3, extracting bit2,1 from the channel #2, extracting bit1,2 from the channel #1, extracting bit0,3 from the channel #0, and then arranging framing bits f0 and f1, the first frame signal is generated. Furthermore, by extracting bit3,6 from the channel #3, extracting bit2,7 from the channel #2, extracting bit1,8 from the channel #1, extracting bit0,9 from the channel #0, and then arranging framing bits f0 and f1, the second frame signal is generated.

After that, the coding section 11b performs coding processing of the frame signal based on the state transition of the duo-binary coding rule, described above with reference to FIG. 2, so that High and Low levels are cyclically arranged at the positions of the framing bits, and thereby generates a duo-binary-coded deskew signal.

Figure 15:
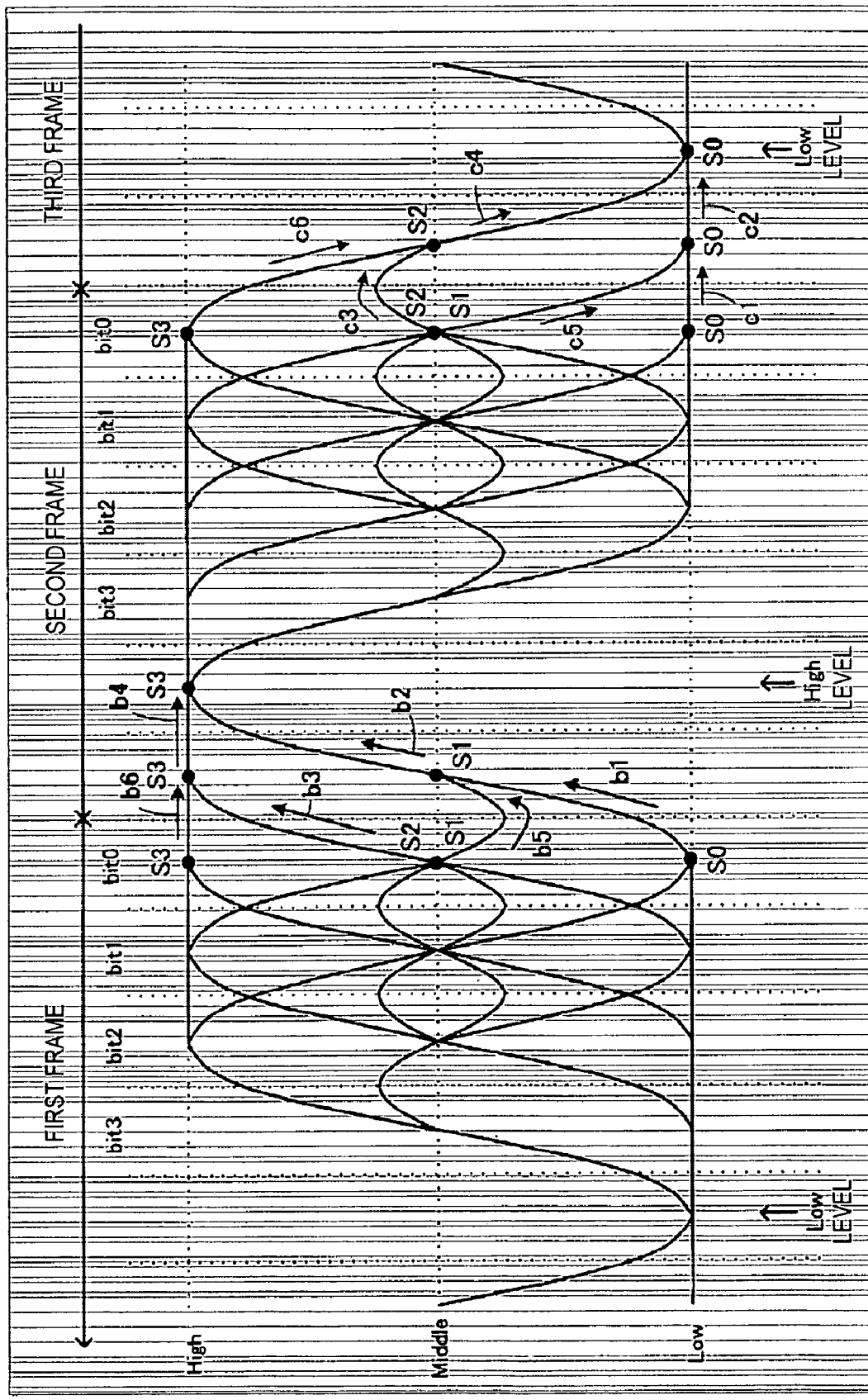
FIG. 15 illustrates generation of a deskew signal.

FIG. 15 illustrates generation of a deskew signal. For example, in the case of setting, to the High level, a position where framing bits in the second frame exist, if bit0 in the first frame is in the state S0, High in a state S3 is set by causing the state to transition through state S0→state S1→state S3 (along the direction of arrows b1→b2).

When bit0 is in the state S1, High in the state S3 is set by causing the state to transition through S1→state S3→state S3 (along the direction of arrows b3→b4). When bit0 is in the state S2, High in the state S3 is set by causing the state to transition through S2→state S1→state S3 (along the direction of arrows b5→b2). When bit0 is in the state S3, High in the state S3 is set by causing the state to transition through S3→state S3→state S3 (along the direction of arrows b6→b4).

On the other hand, in the case of setting, to the Low level, the position where framing bits in the third frame exist, if bit0 in the second frame is in the state S0, Low in the state S0 is set by causing the state to transition through state S0→state S0→state S0 (along the direction of arrows c1→c2).

Furthermore, if bit0 is in the state S1, Low in the state S0 is set by causing the state to transition through state S1→state S2→state S0 (along the direction of arrows c3→c4). If bit0 is in the state S2, Low in the state S0 is set by causing the state to transition through state S2→state S0→state S0 (along the direction of arrows c5→c2). If bit0 is in the state S3, Low in the state S0 is set by causing the state to transition through state S3→state S2→state S0 (along the direction of arrows c6→c4).

Figure 16:
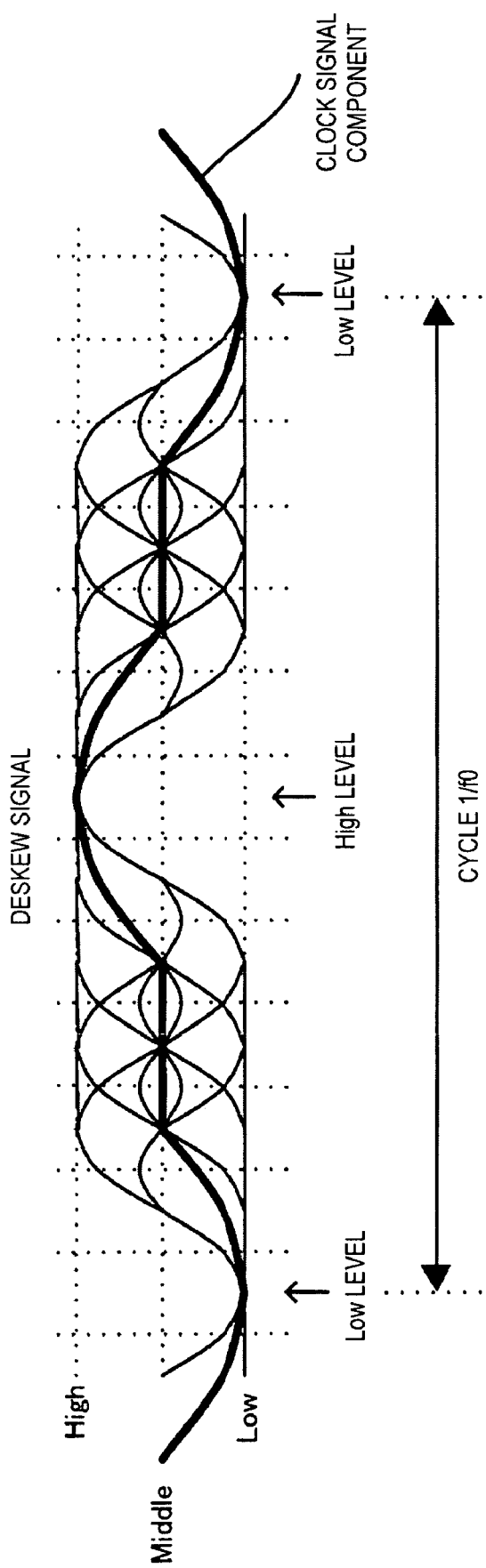
FIG. 16 illustrates generation of a clock signal.
Figure 17:
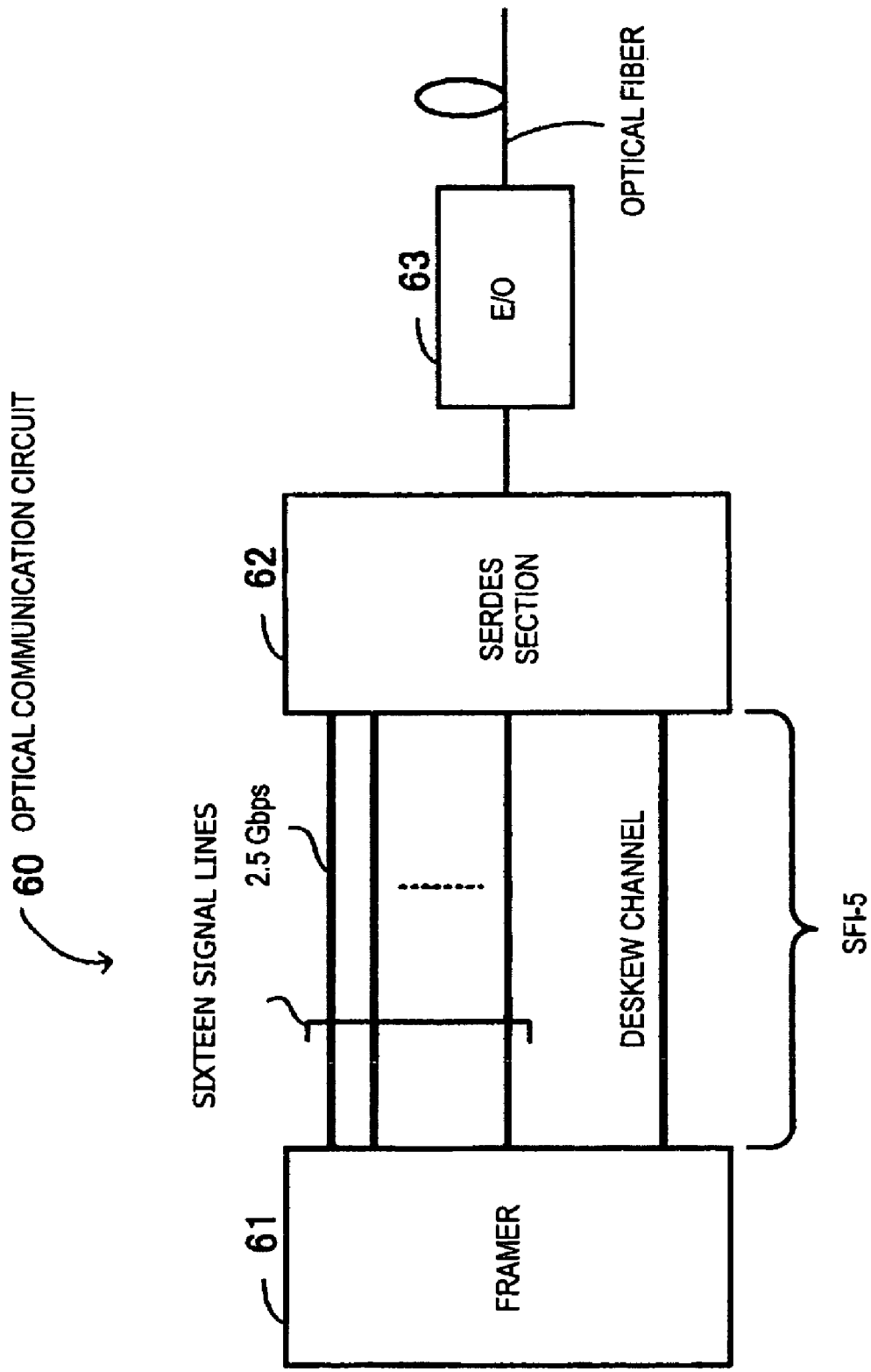
FIG. 17 illustrates an optical communication circuit for which an SFI-5 compliant interface is used.

Next, generation of a clock signal will be described. FIG. 16 illustrates generation of a clock signal. It is assumed that the coding section 11b cyclically sets the High and Low levels for a deskew signal so that the cycle of the High and Low levels of a deskew signal is 1/f0. In this case, since the High and Low levels cyclically exist in the deskew signal, a repeated signal component with a cycle of 1/f0 exists. Therefore, the clock recovery & frame synchronization section 22e performs bandpass filtering control with a center frequency of f0, extracts a line spectrum with a frequency of f0, and generates a clock signal with a frequency of f0.

As described above, as for information data, the transmission apparatus 10-3 of the communication system 1-3 performs duo-binary coding of the information data to generate duo-binary signals of multiple channels and transmits them in parallel. As for a deskew signal, the transmission apparatus 10-3 is configured to generate a duo-binary-coded deskew signal by performing coding processing of a frame signal so that High and Low levels are cyclically arranged at the positions of framing bits. The receiving apparatus 20-3 is configured to extract a line spectrum included in the deskew signal by a bandpass filter and generate a clock signal.

Thus, even in the case of a duo-binary-coded deskew signal having the same transmission rate as data channels, a clock component can be easily extracted from the deskew signal, and the necessity of a complicated logic circuit is reduced. Therefore, it is possible to reduce the circuit scale and power consumption.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. A communication system comprising:
a transmission apparatus including:
a frame signal generation section which generates a frame signal by extracting a part of data from each of channels of input signals of multiple channels and adding framing data for enabling a receiving side to recognize which channel extracted data has been extracted from; and
a coding section which codes the input signals of the multiple channels to generate multi-level-coded signals of the same number of channels and to transmit the multi-level-coded signals in parallel, and which codes the frame signal to generate and transmit a deskew signal for suppressing skew among the multi-level-coded signals; and
a receiving apparatus including:
a decoding section which receives and decodes the multi-level-coded signals to generate decoded signals; and
a deskew processing section which receives the deskew signal and performs deskew processing for compensating skew among the decoded signals of the multiple channels; wherein
the coding section generates the deskew signal as a multi-level-coded deskew signal in which one code takes three or more levels and which has the same transmission rate of a multi-level-coded signal of the multiple channels, by performing coding processing of the frame signal based on a state transition so that High and Low levels are cyclically arranged at positions of the framing data, wherein
the deskew processing section has a clock recovery section which generates a clock signal from the deskew signal; wherein
when the coding section cyclically sets the High and Low levels for the deskew signal so that the cycle of the High level and the Low level of the deskew signal is 1/f0, the deskew processing section generates the clock signal with a frequency of f0 by performing bandpass filtering control with a center frequency of f0.

* * * * *